(12) United States Patent  
Li et al.

(10) Patent No.: US 10,983,313 B1
(45) Date of Patent: Apr. 20, 2021

(54) ANAMORPHIC LENS

(71) Applicant: Zhongshan AZU Optoelectronics Technology Co., Ltd., Zhongshan (CN)

(72) Inventors: Jie Li, Zhongshan (CN); Wei Wu, Zhongshan (CN); Yu Mai, Zhongshan (CN)

(73) Assignee: ZHONGSHAN AZU OPTOELECTRONICS TECHNOLOGY CO., LTD., Zhongshan (CN)

(*) Notice: Subject to any disclaimer, the term of this patent is extended or adjusted under 35 U.S.C. 154(b) by 0 days.

(21) Appl. No.: 17/003,778

(22) Filed: Aug. 26, 2020

Related U.S. Application Data

(63) Continuation of application No. PCT/CN2020/101859, filed on Jul. 14, 2020, and a continuation of application No. 16/753,399, filed as application No. PCT/CN2019/108977 on Sep. 29, 2019.

(30) Foreign Application Priority Data

Jul. 9, 2020 (CN) .................. 2020010660653.8

(51) Int. Cl.
- *G02B 3/00* (2006.01)
- *G02B 9/00* (2006.01)
- *G02B 13/08* (2006.01)
- *G02B 9/64* (2006.01)

(52) U.S. Cl.
CPC ............... *G02B 13/08* (2013.01); *G02B 9/64* (2013.01)

(58) Field of Classification Search
CPC ........... G02B 13/08; G02B 13/12; G02B 9/64
See application file for complete search history.

(56) References Cited

U.S. PATENT DOCUMENTS

2016/0103302 A1* 4/2016 Neil ...................... G02B 7/028
359/670

\* cited by examiner

*Primary Examiner* — Alicia M Harrington
(74) *Attorney, Agent, or Firm* — Loeb & Loeb LLP

(57) ABSTRACT

An anamorphic lens, which includes a cylindrical lens and a spherical lens arranged in sequence from the object side to the image side. The first lens, the second lens, and the third lens are arranged in sequence from the object side to the image side, the first lens and the second lens are cylindrical lenses with negative refractive power, and the third lens has positive refractive power Cylindrical lens. Using the optical characteristics of the cylindrical lens, the incoming horizontal light is "compressed", while the light entering the vertical field of view remains unchanged. After the comprehensive aberration correction of the light, the horizontal field of view angle is increased by 33%. Achieve 1.33× anamorphic shooting. At the same time, because the lens of this solution is smaller in size, lighter in weight, and relatively low in cost, it can better meet the needs of most ordinary users.

20 Claims, 3 Drawing Sheets

ANAMORPHIC LENS

CROSS-REFERENCE TO RELATED APPLICATIONS

This is a US continuation application of PCT international application serial number PCT/CN2020/101859, filed on Jul. 14, 2020, which claims priority to a Chinese patent application, application number 202010660653.8, filed on Jul. 9, 2020. This application is also a continuation-in-part of U.S. application Ser. No. 16/753,399, filed on Apr. 3, 2020, which claims priority to a PCT application, PCT/CN2019/108977, filed on Sep. 29, 2019, which claims priority of a Chinese application, application number 201910916059.8, filed on Sep. 26, 2019. All these applications are incorporated by reference in their entirety herein.

TECHNICAL FIELD

The present invention generally relates to the field of lens technology, in particular to a 75 mm focal length half-frame large aperture anamorphic lens.

BACKGROUND

With the rapid development of web technology, taking photos and videos has become essential part for ordinary consumers. With the promotion of 5G and other technologies in recent years, more and more video sharing such as V log has been used. More individuals shoot short films and micro movies with mobile phones, cameras and other tools.

However, the current normal shooting screen ratio of mobile phones, tablets, cameras and other devices on the market is 16:9, but the cinematic widescreen video ratio is 2.4:1. Therefore, users need to manually edit or digitally cropping method to edit the captured images or videos. However, the pixels of the pictures are sacrificed during cropping or editing.

Some professional anamorphic lens brands such as, Hawk from Germany, Cooke from Great Britain, ARRI from Germany, Panavision from the USA, Angenieux from France and SLR from Hong Kong are usually tailored for professional customers. The prices of these film equipment are generally over tens of thousands of dollars or even more expensive, and anamorphic lenses themselves weighs several kilograms.

Expensive and quality professional anamorphic lenses are not suitable for ordinary users. Therefore, reducing the size of large aperture anamorphic lens and reducing the weight of the lens are technical problems that are to be solved at present embodiments of the invention.

SUMMARY

Therefore, embodiments of the invention attempt technically solve shortcomings in the professional medium telephoto large aperture anamorphic lens where the quality is great but rather costly so that ordinary consumers could not afford. Aspects of the invention provide an anamorphic lens that solve the technical problem with the following embodiments.

An anamorphic lens may include cylindrical lens group in an arrangement of an object side to an image side. The cylindrical lens group may include a anamorphic group of cylindrical lenses and an imaging group having spherical lenses. The anamorphic group may include a first lens, a second lens and a third lens in a sequential order from the object side to the image side. The first lens and the second lens may be negative optical power cylindrical lens and the third lens may be a positive optical power cylindrical lens. The imaging group in a direction of light toward the image side may dispose a fourth lens to Nth lens in a sequential order, where N is greater than or equal to a natural number of 10.

The power distribution of the lenses constituting the anamorphic group and the lenses constituting the imaging group may satisfy the following relationship:

$$70 \text{ mm} < f(1-N)Y < 80 \text{ mm};$$

$$50 \text{ mm} < f(1-N)X < 62 \text{ mm};$$

$$1.20 < f(1-N)Y/f(1-N)X < 1.40;$$

In one embodiment, the curvature direction of the first lens may be the X direction, the Y direction may be the direction perpendicular to X, f(1-N)Y may represent the comprehensive optical focal length of the first lens to the Nth lens along the Y direction, f(1-N)X may represent the comprehensive optical focal length of the first lens to the Nth lens along the X direction.

Further, the first lens may be the front fixed group of the anamorphic lens, the second lens, the third lens . . . , the eleventh lens may be the inner focusing group of the anamorphic lens, so the twelfth lens and the thirteenth lens may be the rear fixed group of the anamorphic lens. In another embodiment, the power distribution of the inner focus group, the front fixed group and the rear fixed group may be as follows:

$$-1.45 < f1X/(f1-13)X < -1.20;$$

$$0.90 < f(2-11)X/f(1-13)X < 1.10;$$

$$-1.10 < f(12-13)X/f(1-13)X < -0.90;$$

In particular, X direction may be the direction of curvature of the lens, Y direction may be the direction perpendicular to X, f(1-N)Y may represent the comprehensive optical focal length of the first lens to the Nth lens along the Y direction, f(1-N)X may represent the comprehensive optical focal length of the first lens to the Nth lens along the X direction.

In a further embodiment, the sixth lens, the seventh lens, the ninth lens, and the thirteenth lens may be spherical lenses with negative refractive power, and the fourth lens, the fifth lens, the eighth lens, the tenth lens, the eleventh lens, and the twelfth lens may be spherical lenses with positive refractive power.

In yet another embodiment, the second lens and the third lens may be joined together.

In a further embodiment, the fifth lens and the sixth lens may be joined together.

In a further embodiment, the seventh lens and the eighth lens may be joined together.

In a further embodiment, the length of the anamorphic lens may be less than 120 mm.

In a further embodiment, the front end of the anamorphic lens may match a 67 mm diameter filter.

In a further embodiment, the anamorphic lens may have a focal length of 75 mm in the Y direction, a focal length of 56.4 mm in the X direction, and an aperture of 1.8.

In a further embodiment, the mass of the anamorphic lens may be less than 700 g.

The technical solution of the present invention has the following advantages:

1. An anamorphic lens provided by the present invention may use an overall or integrated design method to combine three cylindrical lenses and at least the focal power of the seven spherical lenses may be allocated to correct the overall aberration, thereby increasing the angle of view of the horizontal shooting of the lens and making the actual shooting picture wider. IN another embodiment, since there is no need for post-editing, without sacrificing pixels, a user may also get widescreen videos or photos.

2. In one embodiment, the anamorphic lens provided by the present invention is configured to include a front stationary group, an inner focus group and a rear stationary group. In one embodiment, the anamorphic lens may include an inner focus design. In this embodiment, the inner focus group may move inside the lens to achieve the lens focusing on different object distances.

3. In a further embodiment, the anamorphic lens provided by the present invention may include a compact design integrating cylindrical and spherical surfaces to achieve a large aperture of 1.8 while achieving lightness. In one embodiment, the length of the lens may be less than 120 mm, and the front end of the lens may be matched with a 67 mm outer diameter filter, and the lens quality may be less than 700 grams (g).

BRIEF DESCRIPTION OF DRAWINGS

In order to more clearly illustrate the specific embodiments of the present invention or the technical solutions in the prior art, the drawings needed to be used in embodiments or the description of the prior art are briefly introduced below. Obviously, the drawings in the following are some embodiments of the present invention. For those of ordinary skill in the art, other drawings may be obtained based on these drawings without undue creative labor.

Figure 1:
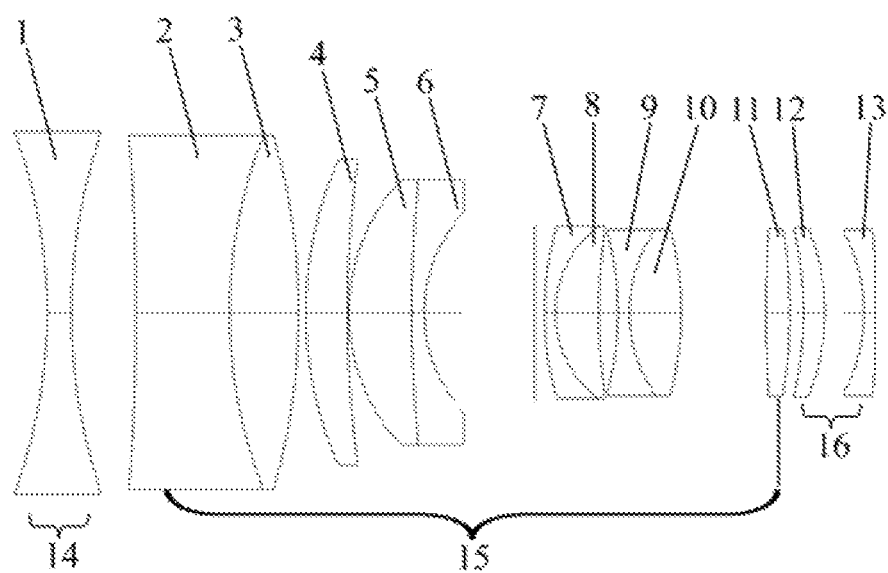
FIG. 1 is an optical structure diagram in an X direction of an anamorphic lens according to a first embodiment of the present invention.

The following lists the labels for the reference numbers: 1—first lens; 2—second lens; 3—third lens; 4—fourth lens; 5—fifth lens; 6—sixth lens; 7—seventh lens; 8—eighth lens; 9—ninth lens; 10—tenth lens; 11—eleventh lens; 12—twelfth lens; 13—thirteenth lens; 14—front stationary group; 15—inner focus group; and 16—rear stationary group.

DETAILED DESCRIPTION

The technical solution of the present invention may be clearly and completely described below with reference to the accompanying drawings. Obviously, the described embodiments may be part of the present invention, but not all of them. Based on the embodiments of the present invention, all other embodiments obtained by a person of ordinary skill in the art without creative efforts shall fall within the protection scope of the present invention.

In the description of the present invention, it is noted that the terms "center", "up", "down", "left", "right", "vertical", "horizontal", "inside", "outside", etc., are meant to indicate orientation or positional relationship and they may be based on the orientation or positional relationship shown in the drawings, and may only be for the convenience of describing the present invention and simplified description, and does not indicate or imply that the device or element referred to must have a specific orientation, a specific construction and operation as they are not be construed as limiting the invention. In addition, the terms "first," "second," and "third" may be used for descriptive purposes only, and should not be construed to indicate or imply relative importance.

In the description of embodiments of the present invention, it is noted that the terms "installation", "connected", and "connected" should be understood in a broad sense unless otherwise specified and limited. For example, they may be fixed connections or removable, connected or integrated; it may be mechanical or electrical; it may be directly connected, or it may be indirectly connected through an intermediate medium, or it may be the internal communication of two elements. For those of ordinary skill in the art, the specific meanings of the above terms of embodiments of the present invention may be understood in a case-by-case basis.

In addition, the technical features involved in the different embodiments of the present invention described below may be combined with each other as long as they do not conflict with each other.

Embodiment 1

Figure 2:
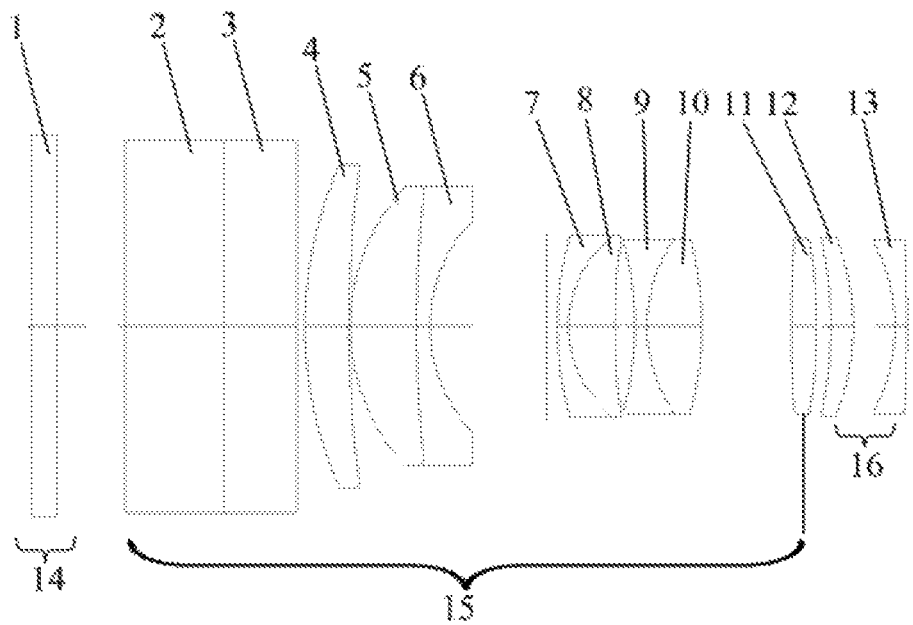
FIG. 2 is an optical structure diagram in an Y direction of an anamorphic lens according to the first embodiment of the present invention.

As shown in FIG. 1 and FIG. 2, the anamorphic lens in this embodiment provide a 75 mm focal length half-frame medium telephoto large aperture anamorphic lens. In one example, the anamorphic lens may include thirteen lenses arranged along the optical path from the object side to the image side. For example, a first lens 1, a second lens 2, the a lens 3, a fourth lens 4, a fifth lens 5, a sixth lens 6, a seventh lens 7, a eighth lens 8, a ninth lens 9, a tenth lens 10, an eleventh lens 11, a twelfth lens 12 and a thirteenth lens 13.

Among them, the first lens 1, the second lens 2, and the third lens 3 may be cylindrical lenses. The second lens 2 and the third lens 3 may be joined or cemented together. In another example, the fourth lens 4, the fifth lens 5, the sixth lens 6, the seventh lens 7, the eighth lens 8, the ninth lens 9, the tenth lens 10, the eleventh lens 11, the twelfth lens 12, and the thirteenth lens may be spherical lenses.

In another example, the first lens 1 in this embodiment may be a cylindrical lens with negative refractive power. The second lens 2 may be a cylindrical lens with negative refractive power, and the third lens 3 may be a cylindrical lens with positive refractive power. The sixth lens 6, the seventh lens 7, the ninth lens 9, and the thirteenth lens 13 may be all negative refractive power spherical lenses. The fourth lens 4, the fifth lens 5, the eighth lens 8, the tenth lens 10, the eleventh lens 11 and the twelfth lens 12 may be spherical lenses with positive refractive power. In another embodiment, the fifth lens 5 and the sixth lens 6 may be joined or cemented together. In another example, the seventh lens 7 and the eighth lens 8 may be joined or cemented together, and the ninth lens 9 and the tenth lens 10 may be joined or cemented together.

In one embodiment, the joined, cemented, or glued lenses may be regarded as an integrated unit. Therefore, the anamorphic lens of this embodiment may include 9 groups of 13 lenses. In one embodiment, there are no limitations on how to combine or join between the second lens 2 and the third lens 3, between the fifth lens 5 and the sixth lens 6, between the seventh lens 7 and the eighth lens 8, or between the ninth lens 9 and the tenth lens 10. In one embodiment, the combination method may include bonding with an adhesive. As an alternative embodiment, other combination method may be used without departing from the scope and spirit of the invention. In order to be distinguished from the present application, one may modify the above example of the combination method, such as bonding, integral molding, etc. These methods may also adaptively change or modify the combined lens shape. These alternative approaches are also within the scope and spirit of protection of this application.

In one embodiment, the values of the actual parameters of each lens may not be specifically limited. In this embodiment, the refractive power of each lens or the lens group may satisfy the following mathematical relationship:

70 mm<$f(1-12)Y$<80 mm;

50 mm<$f(1-12)X$<62 mm;

1.20<$f(1-12)Y/f(1-12)X$<1.40;

−1.45<$f1X/f(1-13)X$<−1.20; 0.90<$f(2-11)X/f(1-13)X$<1.10;

−1.10<$f(12-13)X/f(1-13)X$<−0.90;

In one example, the direction of curvature of the first lens may be the X direction, and the Y direction may be the direction perpendicular to the X direction, which is about 90 degrees with the X direction. f(1-13)Y may be a function representing the comprehensive or composite optical focal length of the lens 1 to 13 in the Y direction, while the function f(1-13)X may represent the comprehensive optical focal length of the lens 1 to 13 in the X direction.

Furthermore, the above-mentioned anamorphic lens may achieve a 75 mm focal length while using an overall design method to distribute the refractive powers of three cylindrical lenses and at least seven spherical lenses to correct the overall aberrations. In such an embodiment, the anamorphic lens may increase the field of view when shooting objects horizontally—making the actual shooting picture wider. With no post-editing of the images or videos required, aspects of the invention achieve wide-screen videos or photos without sacrificing pixels.

The following table may include parameters of each lens in this embodiment that comply with the above mathematical relationship:

TABLE 1

| Lens | Surface Shape | X radius (mm) | Y radius (mm) | Thickness (mm) | Refractive index | Abbe Number | Mass (g) |
| --- | --- | --- | --- | --- | --- | --- | --- |
| First lens | Cylindrical | −72.150 | inf | 3.400 | 1.48 | 70.44 | Appx.25 |
|  | Cylindrical | 77.630 | inf | 9.800 |  |  |  |
| Second lens | Cylindrical | −300.000 | inf | 13.020 | 1.65 | 36.0 | Appx.70 |
| Third lens | Cylindrical | 66.660 | inf | 9.630 | 1.80 | 46.6 | Appx.60 |
|  | Cylindrical | −87.720 | −inf | 1.200 |  |  |  |
| Fourth | Spherical | 52.040 | 52.040 | 5.780 | 1.95 | 18.2 | Appx.20 |
|  | Spherical | 154.690 | 154.690 | 0.220 |  |  |  |
| Fifth lens | Spherical | 26.995 | 26.995 | 8.780 | 1.68 | 55.6 | Appx.20 |
| Sixth lens | Spherical | 180.535 | 180.535 | 1.750 | 1.86 | 23.8 | Appx.15 |
|  | Spherical | 20.287 | 20.287 | 15.300 |  |  |  |
| Light bar |  |  |  | 1.400 |  |  |  |
| Seventh lens | Spherical | 42.400 | 42.400 | 1.500 | 1.95 | 18.2 | Appx.5 |
| Eighth lens | Spherical | 14.810 | 14.810 | 6.070 | 1.80 | 46.6 | Appx.7 |
|  | Spherical | 78.840 | 78.840 | 2.650 |  |  |  |
| Ninth lens | Spherical | −42.150 | −42.150 | 1.600 | 1.87 | 24.1 | Appx.6 |
| Ten lens | Spherical | 20.150 | 20.150 | 7.200 | 1.92 | 19.1 | Appx.7 |
|  | Spherical | −43.906 | −43.906 | 11.757 |  |  |  |
| Eleventh | Spherical | 162.190 | 162.190 | 3.320 | 1.69 | 47.4 | Appx.4 |
|  |  | −71.726 | −71.726 | 1.890 |  |  |  |
| Twelfth lens | Spherical | −53.184 | −53.184 | 3.020 | 1.74 | 28.0 | Appx.3 |
|  | Spherical | −30.740 | −30.740 | 5.490 |  |  |  |
| Thirteenth lens | Spherical | −23.565 | −23.565 | 1.600 | 1.77 | 50.1 | Appx.4 |
|  | Spherical | −181.410 | −181.410 | 18.000 |  |  |  |

In one example, the first to third lenses may be cylindrical lenses, and the fourth to thirteenth lenses may be spherical lenses. In an anamorphic lens that do not embody aspects of the invention, the field of view angle of the lens with a focal length of 75 mm and a 1.8 aperture was:

V (vertical) 12.16°, H (horizontal) 18.46°.

Incorporating the anamorphic lens according to aspects of the invention, the field of view angle of the lens with a focal length of 75 mm and a 1.8 aperture may be: V (vertical) 12.16°, H (horizontal) 24.70°.

In one embodiment, the angle of the field of view in the comparison test may remain unchanged in the vertical direction, and the deformation ratio of the field of view in the horizontal direction is about: 24.70/18.46=1.338.

As such, the actual wide format ratio is in the range of 2.35-2.40, so the distortion ratio is 1.33, that is, the horizontal field of view angle may be increased by 33%, thus realizing 1.33× distortion shooting.

It may be seen from the above table that when the anamorphic lens of this embodiment is produced, the length of the anamorphic lens itself may be less than 120 mm, matching the general-purpose filter with an outer diameter of 67 mm. The mass may be less than 700 g, which is a reduced size of the anamorphic lens, and may be much smaller than the professional film anamorphic lens of the same specification on the market.

Among them, there are no limitations on the material for each lens. In this embodiment, each lens may be made of optical glass.

The lens of this application may further be designed to be compatible with the bayonet of cameras of various brands on the market according to actual use requirements, so as to achieve personalized customization and universal interoperability.

Embodiment 2

Figure 3:
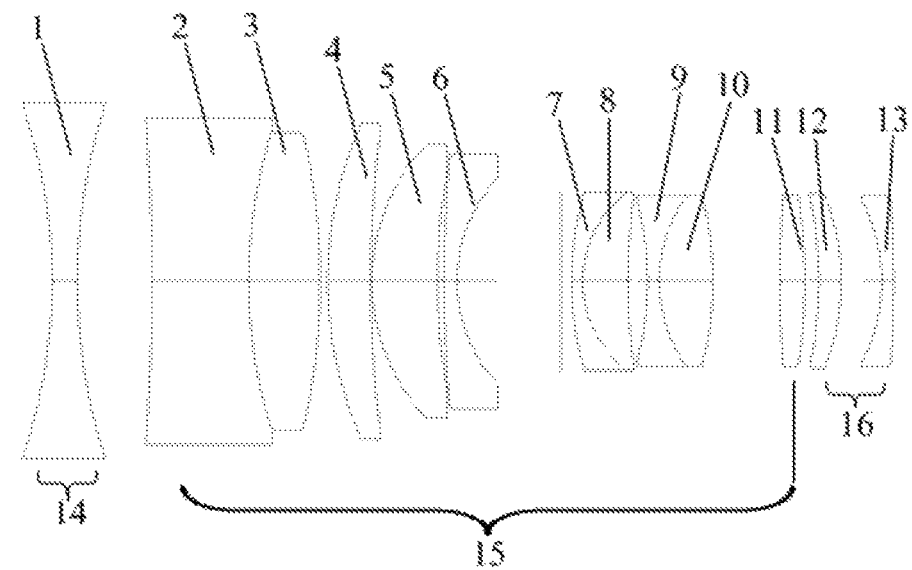
FIG. 3 is an optical structure diagram in an X direction of an anamorphic lens according to a second embodiment of the present invention.
Figure 4:
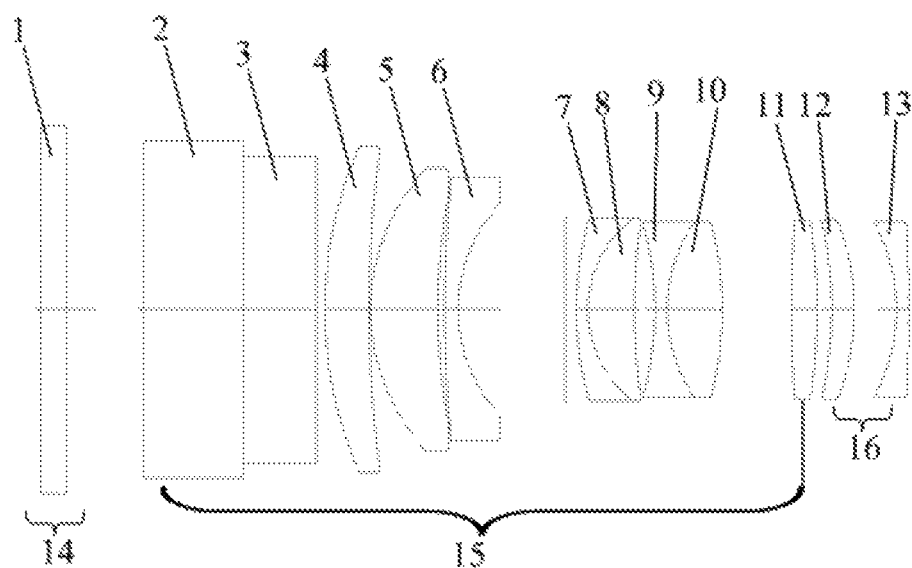
FIG. 4 is an optical structure diagram in an Y direction of an anamorphic lens according to the second embodiment of the present invention.

As shown in FIGS. 3 and 4, embodiments of the invention may provide a 75 mm focal length half-frame anamorphic lens. The difference from the first embodiment may include that the joined or cemented lens of the fifth lens 5 and the sixth lens 6 may be replaced with a positive spherical surface lens and a negative spherical lens to achieve the technical effects of the present application, which will not be repeated here.

Aspects of the invention may be based on the first and second embodiments. If only a single positive lens or a negative lens is simply split or separated, as long as the power distribution of the split lens group is within the scope of the original solution, no substantial innovation may be attributed to such variation.

Moreover, there is no need and cannot be exhaustive for all implementations. However, the obvious changes or variations introduced thereby are still within the protection scope created by the present invention.

The invention claimed is:

1. An anamorphic lens comprising:
a cylindrical lens group and a spherical lens group arranged in order from the object side to the image side, the cylindrical lens group being a first lens, a second lens and a third lens in sequence; wherein the first lens and the second lens comprise cylindrical lenses with negative refractive power, and the third lens comprises a cylindrical lens with positive refractive power;
wherein the spherical lens group comprises a fourth lens in sequence along the optical path toward the image side to Nth lens, where N is a natural number greater than or equal to 10;
wherein a distribution of refractive powers constituting the cylindrical lens group and the spherical lens group comprises the following relationship:

$70\ mm < f(1-N)Y < 80\ mm;$ $50\ mm < f(1-N)X < 62\ mm;$ $1.20 < f(1-N)Y/f(1-N)X < 1.40;$ wherein, a curvature direction of the first lens comprises a X direction, a Y direction is a direction perpendicular to X, a function f(1−N)Y represents a comprehensive optical focal length of the first lens to the Nth lens along the Y direction, and a function f(1−N)X represents the comprehensive optical focal length of the first lens to the Nth lens along the X direction.

2. The anamorphic lens of claim 1, wherein the first lens comprises a front stationary group thereof; the second lens, the third lens, the fourth lens, the fifth lens, the sixth lens, the seventh lens, the eighth lens, the ninth lens, the tenth lens, and the eleventh lens comprise an inner focus group thereof; and the twelfth lens and the thirteenth lens comprise a rear stationary group thereof;
wherein, the inner focus group, the front stationary group and the rear stationary group comprise an optical power distribution of:

$-1.45 < f1X/(f1-13)X < -1.20;$ $0.90 < f(2-11)X/f(1-13)X < 1.10;$ and $-1.10 < f(12-13)X/f(1-13)X < -0.90.$ 3. The anamorphic lens according to claim 2, wherein the sixth lens, the seventh lens, the ninth lens, and the thirteenth lens comprise spherical lenses with negative refractive power, and the fourth lens, the fifth lens, the eighth lens, the tenth lens, the eleventh lens and the twelfth lens comprise spherical lenses with positive refractive power.

4. The anamorphic lens according to claim 2, wherein the second lens and the third lens are configured to be joined together.

5. The anamorphic lens according to claim 2, wherein the fifth lens and the sixth lens are configured to be joined together.

6. The anamorphic lens according to claim 2, wherein the seventh lens and the eighth lens are configured to be joined together.

7. The anamorphic lens according to claim 2, wherein the length of the anamorphic lens is configured to be less than 120 mm.

8. The anamorphic lens of claim 7, wherein the front end of the anamorphic lens is matched with a 67 mm diameter filter.

9. The anamorphic lens of claim 7, wherein the front end of the anamorphic lens is matched with a 67 mm diameter filter.

10. The anamorphic lens according to claim 2, wherein the anamorphic lens comprises a focal length of 75 mm along the Y direction, a focal length of 56.4 mm along the X direction, and an aperture of 1.8.

11. The anamorphic lens according to claim 2, wherein a mass of the anamorphic lens is configured to be less than 700 g.

12. The anamorphic lens according to claim 1, wherein the second lens and the third lens are configured to be joined together.

13. The anamorphic lens according to claim 1, wherein the fifth lens and the sixth lens are configured to be joined together.

14. The anamorphic lens according to claim 1, wherein the seventh lens and the eighth lens are configured to be joined together.

15. The anamorphic lens according to claim 1, wherein the length of the anamorphic lens is configured to be less than 120 mm.

16. The anamorphic lens according to claim 1, wherein the anamorphic lens comprises a focal length of 75 mm along the Y direction, a focal length of 56.4 mm along the X direction, and an aperture of 1.8.

17. The anamorphic lens according to claim 1, wherein a mass of the anamorphic lens is configured to be less than 700 g.

18. An external anamorphic lens comprising:
a cylindrical lens group and a spherical lens group arranged in order from the object side to the image side, the cylindrical lens group being a first lens, a second lens and a third lens in sequence; wherein the first lens and the second lens comprise cylindrical lenses with negative refractive power, and the third lens comprises a cylindrical lens with positive refractive power;

wherein the spherical lens group comprises a fourth lens in sequence along the optical path toward the image side to Nth lens, where N is a natural number greater than or equal to 10;

wherein a distribution of refractive powers constituting the cylindrical lens group and the spherical lens group comprises the following relationship:

70 mm<$f(1-N)Y$<80 mm;

50 mm<$f(1-N)X$<62 mm;

1.20<$f(1-N)Y/f(1-N)X$<1.40;

wherein, a curvature direction of the first lens comprises a X direction, a Y direction is a direction perpendicular to X, a function f(1–N)Y represents a comprehensive optical focal length of the first lens to the Nth lens along the Y direction, and a function f(1–N)X represents the comprehensive optical focal length of the first lens to the Nth lens along the X direction.

19. The external anamorphic lens of claim 18, wherein the first lens comprises a first group thereof; the second lens, the third lens, the fourth lens, the fifth lens, the sixth lens, the seventh lens, the eighth lens, the ninth lens, the tenth lens, and the eleventh lens comprise a second group thereof; and the twelfth lens and the thirteenth lens comprise a third group thereof;

wherein an optical power distribution of the first group, the second group, and the third group comprises:

−1.45<$f1X/(f1-13)X$<−1.20;

0.90<$f(2-11)X/f(1-13)X$<1.10; and

−1.10<$f(12-13)X/f(1-13)X$<−0.90.

20. An portable anamorphic lens comprising:
a cylindrical lens group and a spherical lens group arranged in order from the object side to the image side, the cylindrical lens group being a first lens, a second lens and a third lens in sequence; wherein the first lens and the second lens comprise cylindrical lenses with negative refractive power, and the third lens comprises a cylindrical lens with positive refractive power;

wherein the spherical lens group comprises a fourth lens in sequence along the optical path toward the image side to Nth lens, where N is a natural number greater than or equal to 10;

wherein a distribution of refractive powers constituting the cylindrical lens group and the spherical lens group comprises the following relationship:

70 mm<$f(1-N)Y$<80 mm;

50 mm<$f(1-N)X$<62 mm;

1.20<$f(1-N)Y/f(1-N)X$<1.40;

wherein the first lens further comprises a first group thereof; the second lens, the third lens, the fourth lens, the fifth lens, the sixth lens, the seventh lens, the eighth lens, the ninth lens, the tenth lens, and the eleventh lens comprise a second group thereof; and the twelfth lens and the thirteenth lens comprise a third group thereof;

wherein an optical power distribution of the first group, the second group, and the third group comprises:

−1.45<$f1X/(f1-13)X$<−1.20;

0.90<$f(2-11)X/f(1-13)X$<1.10; and

−1.10<$f(12-13)X/f(1-13)X$<−0.90;

wherein, a curvature direction of the first lens comprises a X direction, a Y direction is a direction perpendicular to X, a function f(1–N)Y represents a comprehensive optical focal length of the first lens to the Nth lens along the Y direction, and a function f(1–N)X represents the comprehensive optical focal length of the first lens to the Nth lens along the X direction.

* * * * *